United States Patent
Okada (10) Patent No.: US 9,952,121 B2
(45) Date of Patent: Apr. 24, 2018

(54) AIR PRESSURE CIRCUIT FOR TIRE TESTING DEVICE

(71) Applicant: KOBE STEEL, LTD., Hyogo (JP)

(72) Inventor: Toru Okada, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 420 days.

(21) Appl. No.: 14/782,226

(22) PCT Filed: Mar. 5, 2014

(86) PCT No.: PCT/JP2014/055682
§ 371 (c)(1),
(2) Date: Oct. 2, 2015

(87) PCT Pub. No.: WO2014/162817
PCT Pub. Date: Oct. 9, 2014

(65) Prior Publication Data
US 2016/0025598 A1    Jan. 28, 2016

(30) Foreign Application Priority Data
Apr. 3, 2013   (JP) .................. 2013-077410

(51) Int. Cl.
*G01M 17/02*   (2006.01)
*B60S 5/04*   (2006.01)
*G05D 16/20*   (2006.01)

(52) U.S. Cl.
CPC ............. *G01M 17/02* (2013.01); *B60S 5/046* (2013.01); *G05D 16/2013* (2013.01)

(58) Field of Classification Search
CPC .................................................. G01M 17/02
(Continued)

(56) References Cited

U.S. PATENT DOCUMENTS

| 4,702,287 A | 10/1987 | Higbie et al. |
| 4,850,402 A | 7/1989 | Cunningham et al. |

(Continued)

FOREIGN PATENT DOCUMENTS

| DE | 19847322 A1 | 4/2000 |
| EP | 0265037 A1 | 4/1988 |

(Continued)

OTHER PUBLICATIONS

The extended European search report issued by the European Patent Office dated Nov. 11, 2016, which corresponds to European Patent Application No. 14778822.8-1557 and is related to U.S. Appl. No. 14/782,226.

(Continued)

*Primary Examiner* — Hezron E Williams
*Assistant Examiner* — Tarun Sinha
(74) *Attorney, Agent, or Firm* — Studebaker & Brackett PC (57) ABSTRACT

A pneumatic circuit of a tire testing apparatus includes: a piping configured to guiding air from an air supply source to a tire; a control part configured to output a target command pressure; a pressure proportional control valve part; and a constant-flow air discharge part. The pressure proportional control valve part supplies and discharges the air of a flow rate proportional to a differential pressure between the target command pressure and an internal pressure of the tire so that the internal pressure of the tire becomes the target command pressure, and has a dead band in which the air is not supplied and discharged within a predetermined range. The constant-flow air discharge part is formed between the tire and the pressure proportional control valve part, and is configured to discharge the air of an inside of the piping to an outside at a constant flow rate.

4 Claims, 7 Drawing Sheets

(58) Field of Classification Search
USPC .......................................................... 73/146
See application file for complete search history.

(56) References Cited

U.S. PATENT DOCUMENTS

| | | | | |
|---|---|---|---|---|
| 6,067,850 | A * | 5/2000 | Lang | B60S 5/046 |
| | | | | 152/415 |
| 2004/0118198 | A1 | 6/2004 | Rothamel | |
| 2012/0085158 | A1* | 4/2012 | Murakami | G01M 17/021 |
| | | | | 73/146 |

FOREIGN PATENT DOCUMENTS

| | | |
|---|---|---|
| JP | H06-95057 B2 | 11/1994 |
| JP | H10-206289 A | 8/1998 |
| JP | 2011-2296 A | 1/2011 |
| JP | 2011-069772 A | 4/2011 |
| JP | 2011-123007 A | 6/2011 |

OTHER PUBLICATIONS

International Search Report; PCT/JP2014/055682; dated Apr. 8, 2014.
Translation of Written Opinion of the International Searching Report; PCT/JP2014/055682; dated Apr. 8, 2014.

* cited by examiner

AIR PRESSURE CIRCUIT FOR TIRE TESTING DEVICE

TECHNICAL FIELD

The present invention relates to a pneumatic circuit of a tire testing apparatus such as a tire uniformity machine.

BACKGROUND ART

Figure 5:
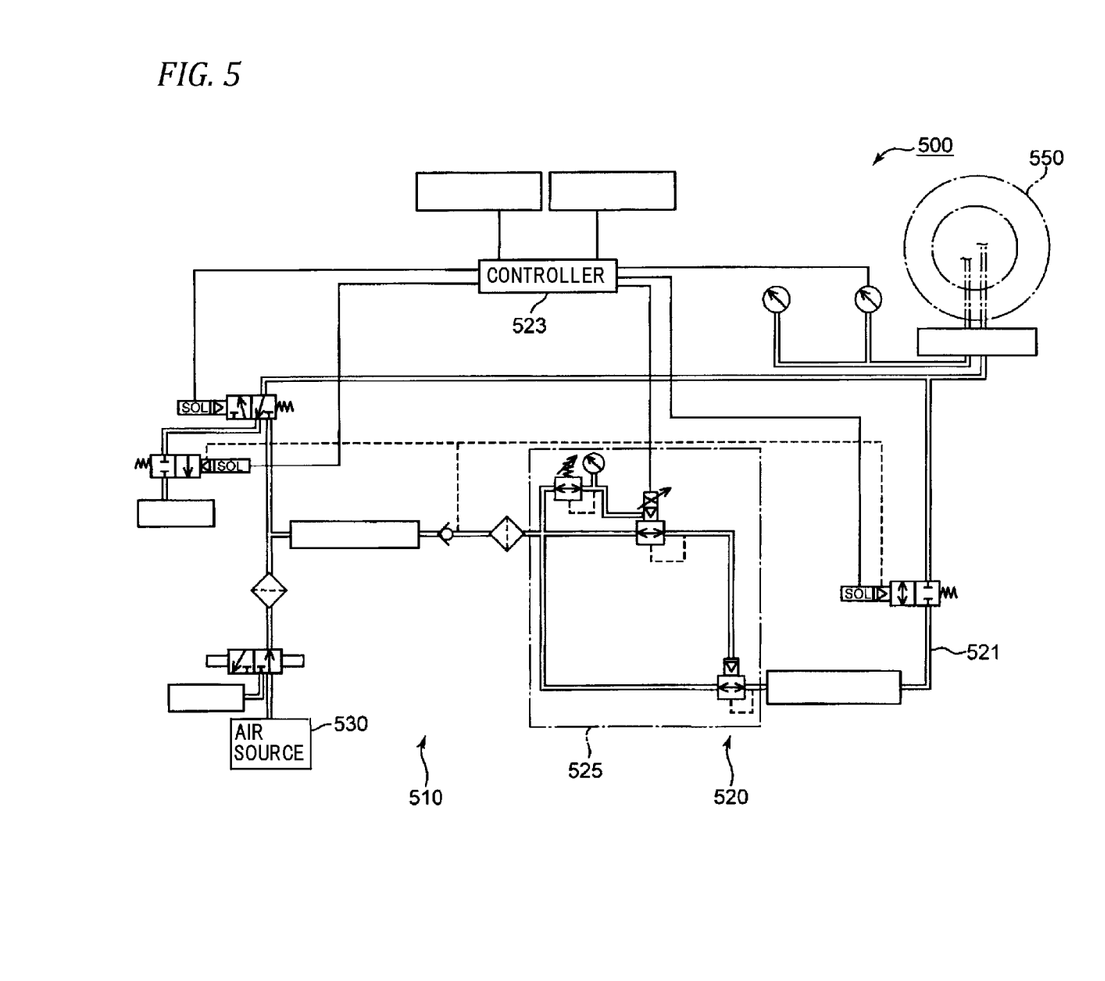
FIG. 5 is a schematic configuration diagram of the conventional tire testing apparatus.

A tire testing apparatus disclosed in Patent Reference 1 is known conventionally. This tire testing apparatus measures uniformity (uniformity) of a tire at the time of rotating the tire with the tire attached to a rim. This tire testing apparatus includes a pneumatic circuit 510 having a test system 520 for regulating an internal pressure of a tire 550 at the time of measuring the uniformity as shown in FIG. 5. The test system 520 of this pneumatic circuit 510 has air supply piping 521, a controller 523, and a pressure regulator (pressure proportional control valve) 525.

The air supply piping 521 makes connection between the tire 550 and an air source 530 such as a compressor, and guides compressed air from the air source 530 to the tire 550. The controller 523 outputs an internal pressure (target command pressure) of the tire 550 used as a target in the case of measuring the uniformity to the pressure regulator 525. The pressure regulator 525 is formed on the air supply piping 521, and regulates a flow rate of air of the inside of the air supply piping 521 so that the internal pressure of the tire 550 becomes the target command pressure. Concretely, the pressure regulator 525 maintains the internal pressure of the tire 550 at the target command pressure by supplying and discharging the air from the air source 530 to and from the tire 550 so as to become a flow rate proportional to a differential pressure (hereinafter simply called a "differential pressure") between the internal pressure of the tire 550 and the target command pressure from the controller 523.

In the tire testing apparatus 500 described above, in a state in which the test system 520 of the pneumatic circuit 510 maintains the internal pressure of the tire 550 at the target command pressure, a drum (not shown) is pressed on the tire 550 and the tire 550 is rotated and a repulsion force generated in the tire 550 is measured by, for example, a load measuring device (not shown) formed on the drum and thereby, the uniformity of the tire 550 is measured.

CITATION LIST

Patent Reference

Patent Reference 1: JP-B-6-95057

SUMMARY OF THE INVENTION

Problems that the Invention is to Solve

In the tire test to measure the uniformity of the tire 550, a change in the repulsion force of the tire 550 at the time of rotating the tire 550 with the drum pressed on the tire 550 is measured, with the result that it becomes important to maintain the internal pressure of the tire 550 constant at a predetermined pressure (target command pressure) in the case of measuring the repulsion force.

However, the tire testing apparatus 500 described above, the internal pressure of the tire 550 may be decreased or increased during the tire test. In such a case, a change in the internal pressure influences a measurement result of the uniformity, with the result that the measurement result varies depending on measurement timing of the tire test, and measurement accuracy of the tire testing apparatus 500 is decreased. Variations in the internal pressure of the tire 550 during this tire test occur as described below.

Figure 6:
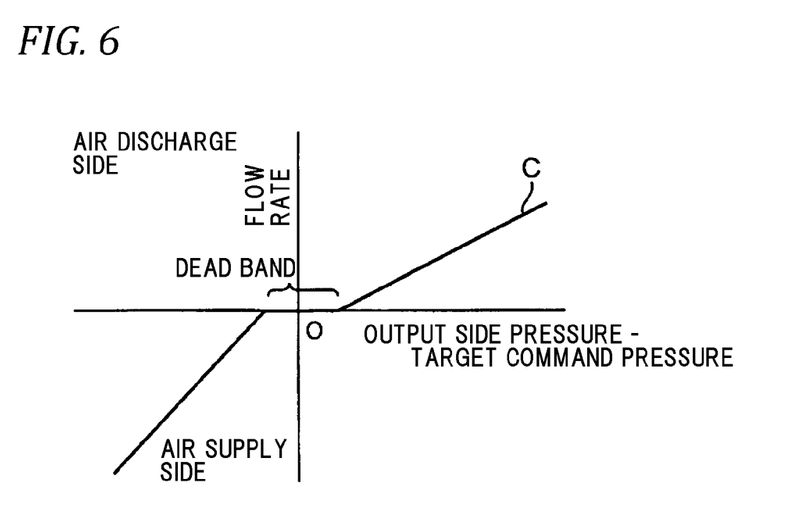
FIG. 6 is a graph showing a characteristic curve of air supply and discharge of a pressure regulator in a pneumatic circuit of the conventional tire testing apparatus.

Since the pressure regulator 525 does not supply and discharge air in the range in which the differential pressure between the target command pressure and the internal pressure of the tire 550 is in a predetermined range (dead band) including zero as shown in FIG. 6, supply and discharge of the air are stopped when the internal pressure of the tire 550 is regulated to the target command pressure for the tire test. In this state, the uniformity of the tire 550 is measured. At this time, a temperature difference may be caused between an air temperature of the inside of the tire 550 and an ambient temperature of the tire 550 itself, a rim, etc., and in this case, during the tire test, the air temperature of the tire 550 is changed but the differential pressure is in the dead band, with the result that the pressure regulator 525 does not supply and discharge the air and thereby, the internal pressure of the tire 550 is changed with the change in the air temperature.

Also, it is contemplated to measure the uniformity after the differential pressure passes through the dead band by the air temperature of the inside of this tire 550 and the internal pressure of the tire 550 waits to become stable, but it takes time to measure the uniformity, and inspection efficiency is decreased.

Hence, an object of the invention is to provide a pneumatic circuit of a tire testing apparatus capable of regulating an internal pressure of a tire with high accuracy in a short time in view of the problem described above.

Means for Solving the Problems

To solve the problems, a pneumatic circuit of a tire testing apparatus for measuring uniformity of a tire of the invention, including: a piping configured to guide air from an air supply source to the tire; a control part configured to output a target command pressure which is a value of a predetermined air pressure; a pressure proportional control valve part which is formed on the piping and supplies and discharges the air of a flow rate proportional to a differential pressure between the target command pressure and an internal pressure of the tire so that the internal pressure of the tire becomes the target command pressure and has a dead band in which the air is not supplied and discharged within a predetermined range including the differential pressure of zero; and a constant-flow air discharge part which is formed between the tire and the pressure proportional control valve part in the piping and is configured to discharge the air of an inside of the piping to an outside at a constant flow rate.

According to such a configuration, by discharging the air of the inside of the piping from the constant-flow air discharge part to the outside at the constant flow rate, a characteristic curve (hereinafter simply called a "characteristic curve") of air supply and discharge based on the differential pressure in the whole piping system can be shifted to an air discharge side by the constant flow rate (see FIG. 2A) and thereby, the dead band included in the characteristic curve is also shifted to the air discharge side and the internal pressure of the tire can be regulated with high accuracy in a short time. Concretely, explanation is given below.

Figure 2A:
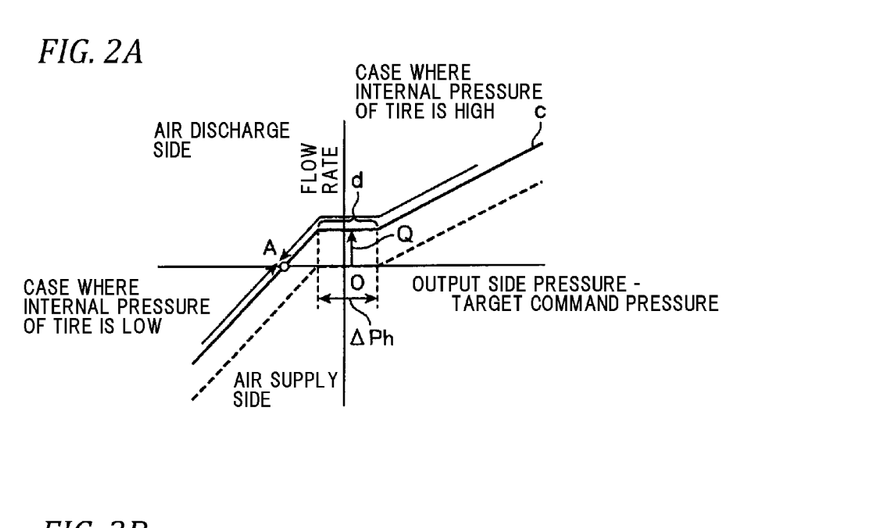
FIG. 2A is an explanatory diagram showing a situation in which a characteristic curve of the whole piping system is shifted to the air discharge side by air discharge through a constant-flow air discharge part in the characteristic curve of air supply and discharge of a pressure proportional control valve part in a pneumatic circuit of the tire testing apparatus.

By shifting the dead band to the air discharge side, also in the dead band in which the pressure proportional control valve does not supply and discharge the air, the internal pressure of the tire continues to be decreased by the air discharge from the constant-flow air discharge part and when the differential pressure (hereinafter simply called the "differential pressure") between the internal pressure of the tire and the target command pressure becomes a minus side beyond the dead band in the characteristic curve shown in FIG. 2A, air supply operation of the pressure proportional control valve part is started and the differential pressure is maintained at a predetermined value (point A). Accordingly, the internal pressure of the tire can be regulated with higher accuracy in a shorter time than a conventional pneumatic circuit in which the differential pressure is maintained by the dead band.

According to the pneumatic circuit of the tire testing apparatus of the invention, it is preferable that the constant-flow air discharge part discharges the air to the outside at a flow rate at which the dead band is positioned to an air discharge side when an air temperature of an inside of the tire is increased at the time of measuring the uniformity.

Figure 2B:
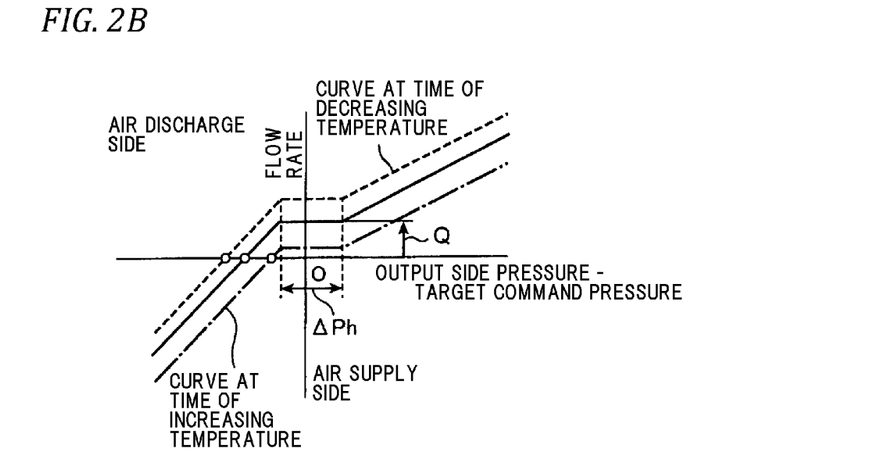
FIG. 2B is an explanatory diagram showing a situation in which the characteristic curve of the whole piping system is shifted to the air discharge side or the air supply side when an air temperature of the inside of a tire is increased or decreased in the characteristic curve of the air supply and discharge of the pressure proportional control valve part in the pneumatic circuit of the tire testing apparatus.

The characteristic curve including the dead band is shifted to an air supply side by an increase in air temperature of the inside of the tire (see FIG. 2B). As a result, the flow rate of the air discharged from the constant-flow air discharge part is set so as to position the dead band to the air discharge side in a state in which this characteristic curve is shifted to the air supply side and thereby, the internal pressure of the tire can be regulated more surely with higher accuracy in a shorter time.

In this case, for example, concretely, a mass flow rate Q (kg/s) of the air discharged to the outside by the constant-flow air discharge part is larger than a value expressed by the following formula (1) and thereby, the dead band in the characteristic curve surely becomes the air discharge side.

$$Q=(V/RT)\gamma \quad (1)$$

Here, V is volume ($m^3$) of the inside of the tire and the inside of the piping from the tire to the pressure proportional control valve part, and T is an absolute temperature (K) of the air of the inside of the piping, and R is a gas constant (J/kg/K) of dry air, and γ is an increment (Pa/s) per second in the internal pressure of the tire at the time of stopping operation of the constant-flow air discharge part and the pressure proportional control valve part in a state in which the internal pressure of the tire is a test pressure at the time of measuring the uniformity.

Also, the mass flow rate Q (kg/s) of the air discharged to the outside by the constant-flow air discharge part is more preferably expressed by the following formula (2).

$$Q=(V/RT)\gamma+(\alpha\Delta Ph/2) \quad (2)$$

Here, α is a ratio (kg/Pa) of a change in air supply mass to a change in the differential pressure of an air supply side of the pressure proportional control valve part, and ΔPh is a range (Pa) of the differential pressure of the dead band.

According to such a configuration, the differential pressure in the air discharge side including the dead band in the characteristic curve can be regulated at a speed similar to that of regulation of the differential pressure in the air supply side, with the result that the amount of use of the air can be reduced while shortening time for regulating the internal pressure of the tire.

Advantage of the Invention

From the above, the invention can provide the pneumatic circuit of the tire testing apparatus capable of regulating the internal pressure of the tire with high accuracy in a short time.

MODES FOR CARRYING OUT THE INVENTION

Figure 1:
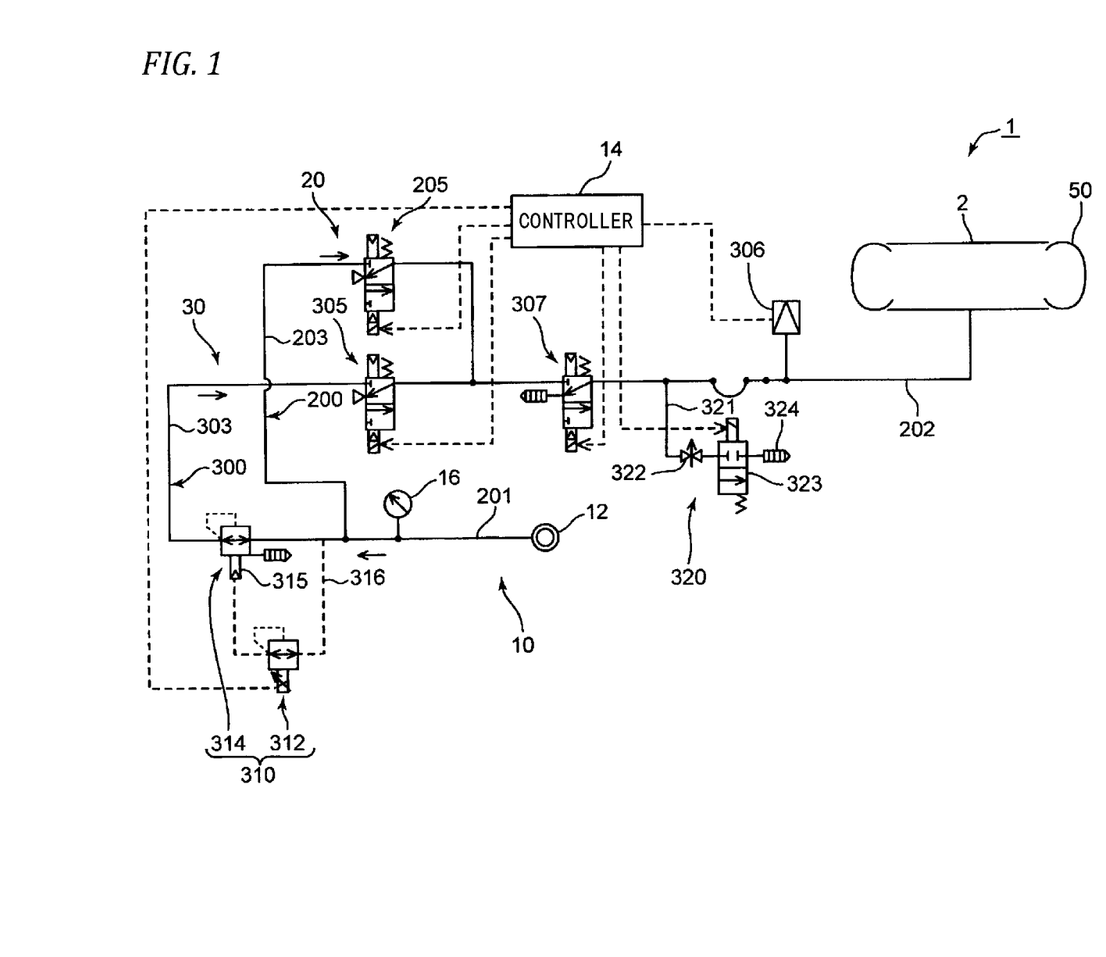
FIG. 1 is a schematic configuration diagram of a tire testing apparatus according to the present embodiment.
Figure 2C:
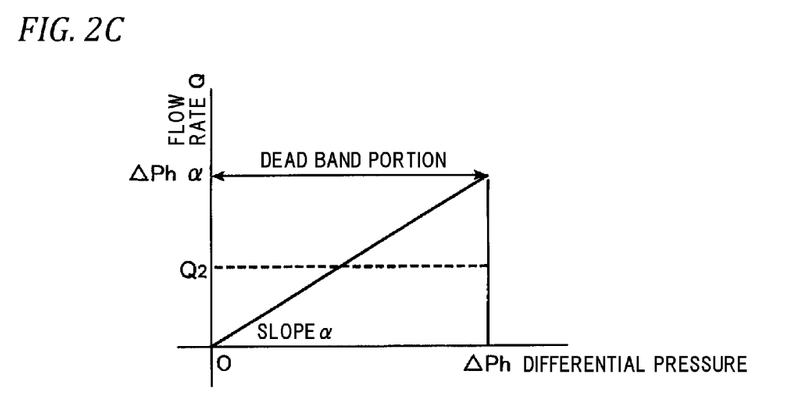
FIG. 2C is an explanatory diagram showing an air flow rate discharged from the constant-flow air discharge part at a speed equivalent to that in the case of considering that the pressure proportional control valve part is actuated with respect to a range of a differential pressure of a dead band in the characteristic curve of the air supply and discharge of the pressure proportional control valve part in the pneumatic circuit of the tire testing apparatus.

One embodiment of the invention will hereinafter be described with reference to FIG. 1, FIG. 2A, FIG. 2B and FIG. 2C. FIG. 1 is a schematic configuration diagram of a tire testing apparatus according to the present embodiment. FIG. 2A is a diagram showing a situation in which a characteristic curve of the whole piping system is shifted to the air discharge side by air discharge through a constant-flow air discharge part in the characteristic curve of air supply and discharge of a pressure proportional control valve part in a pneumatic circuit of the tire testing apparatus. FIG. 2B is a diagram showing a situation in which the characteristic curve of the whole piping system is shifted to the air discharge side or the air supply side when an air temperature of the inside of a tire is increased or decreased. FIG. 2C is an explanatory diagram showing an air flow rate discharged from the constant-flow air discharge part at a speed equivalent to that in the case of considering that the pressure proportional control valve part is actuated with respect to a range of a differential pressure of a dead band.

The pneumatic circuit of the tire testing apparatus of the embodiment is used in, for example, a uniformity machine for making a product inspection of uniformity (uniformity) on a finished tire, and regulates an internal pressure (air pressure) of the tire by supplying and discharging compressed air (hereinafter simply called "air") to and from the tire. This pneumatic circuit includes an air supply source 12, two piping systems (a bead seat system 20 and a test system 30) as a path of air leading from the air supply source 12 to a tire 50, and a controller (control part) 14 as shown in FIG. 1. The bead seat system 20 and the test system 30 of the embodiment share a part of the piping. That is, the bead seat system 20 and the test system 30 are branched on the way to the path leading to the tire 50 and are again joined to one piping in the downstream side and then are connected to the tire 50. In addition, the bead seat system 20 and the test system 30 may be separately arranged from the air supply source 12 to the tire 50. Also, a pneumatic circuit 10 may have a configuration of using an air supply source of the outside (that is, a configuration without having the air supply source 12).

The air supply source 12 is, for example, an air compressor or an air tank in which air is accumulated in factory area and supplies air with the same pressure as air pressure at the time of inflating the tire 50 through the bead seat system 20. The downstream side (first piping 201 in an example of the embodiment) of this air supply source 12 is provided with an air filter (not shown), and a pressure gauge 16 for observing a pressure (air pressure) of the air (compressed air) supplied from the air supply source 12.

The bead seat system 20 has the piping 201 for guiding air from the air supply source 12 to the tire 50, and a first shutoff valve 205, and supplies the air with a predetermined pressure (bead seat pressure) to the tire 50 in order to inflate the tire 50 in a short time and press a bead part of the tire 50 on a rim 2 formed on a uniformity machine 1. The bead seat pressure of the embodiment is, for example, about 0.4 MPa.

Piping 200 has the first piping 201 connected to the air supply source 12, second piping 202 connected to the tire 50, and bead seat side piping 203 for making connection between the first piping 201 and the second piping 202 in a state branched from the test system 30. In addition the first piping 201 and the second piping 202 construct a part of piping 300 of the test system 30.

The first shutoff valve 205 is formed on the bead seat side piping 203, and switches a position of the valve based on an instruction signal from the controller 14, and opens and closes the bead seat side piping 203 (that is, the piping 200 of the bead seat system 20).

The test system 30 has the piping 300 for guiding air from the air supply source 12 to the tire 50, a second shutoff valve 305, a pressure sensor (pressure measuring part) 306, a pressure proportional control valve part 310, a supply and discharge valve 307, and a constant-flow air discharge part 320. This test system 30 performs regulation so that the internal pressure of the tire 50 in the case of testing (measuring) the uniformity of the tire 50 becomes a predetermined pressure (test pressure) lower than the bead seat pressure. The test pressure of the embodiment is, for example, about 0.2 MPa.

The piping 300 has the first piping 201 connected to the air supply source 12, the second piping 202 connected to the tire 50, and test side piping 303 for making connection between the first piping 201 and the second piping 202 in a state branched from the bead seat system 20.

The second shutoff valve 305 is formed on the test side piping 303, and switches a position of the valve based on an instruction signal from the controller 14, and opens and closes the test side piping 303 (that is, the piping 300 of the test system 30).

The pressure sensor 306 is formed on the second piping 202, and measures a pressure of air of the inside of the second piping 202, that is, an internal pressure of the tire 50. This pressure sensor 306 outputs a pressure signal according to the measured internal pressure of the tire 50 to the controller 14.

The pressure proportional control valve part 310 is formed on the test side piping 303 of the test system 30, and regulates an internal pressure of the tire 50, that is, an air pressure in the piping 300 of the downstream side of the pressure proportional control valve part 310 using an inputted target command pressure (a value of a predetermined air pressure) as a target. The pressure proportional control valve part 310 of the embodiment has an electropneumatic regulator 312, a volume booster 314, and regulator piping 316 branched from the test side piping 303 and extending to the volume booster 314.

The electropneumatic regulator 312 is formed on the regulator piping 316, and regulates a pressure of air supplied to the volume booster 314 through the regulator piping 316 according to an electrical signal (target command pressure) from the controller 14. That is, in the electropneumatic regulator 312, a target pressure is set by the electrical signal from the controller 14, and air of this target pressure (pilot pressure) is supplied to a pilot pressure input port 315 of the volume booster 314.

In addition, the target command pressure of the embodiment is set based on a test pressure and a flow rate of air discharged from the constant-flow air discharge part 320. That is, the target command pressure is a pressure value set so that the internal pressure of the tire 50 becomes the test pressure in a state in which air of the inside of the second piping 202 is discharged from the constant-flow air discharge part 320 to the outside at a predetermined flow rate (mass flow rate Q described below).

The volume booster 314 is formed on the downstream side beyond a branch position of the regulator piping 316 in the test side piping 303. The volume booster 314 performs regulation so that a pressure (line pressure) of the inside of a site of the downstream side of the volume booster 314 in the test side piping 303 becomes equal to the target pressure inputted to the pilot pressure input port 315. Concretely, the volume booster 314 is constructed so that air of the inside of the site of the downstream side in the test side piping 303 is discharged to the outside when the line pressure becomes higher than the target pressure, and air from air supply source 12 is supplied to the inside of the site of the downstream side of the test side piping 303 when the line pressure becomes lower than the target pressure.

In such a pressure proportional control valve part 310 having the electropneumatic regulator 312 and the volume booster 314, a characteristic curve c (hereinafter simply called a "characteristic curve c") of air supply and discharge has a dead band d like a characteristic curve of air supply and discharge of a pressure regulator in a conventional pneumatic circuit as shown in FIG. 6. This characteristic curve c is a curve showing air supply and discharge characteristics of the pressure proportional control valve part 310 in the case where the axis of abscissa is set at a differential pressure (hereinafter simply called a "differential pressure") between a target command pressure and a pressure (a line pressure, an internal pressure of the tire) of the output side of the pressure proportional control valve part (volume booster 314 in the example of the embodiment) and the axis of ordinate is set at a flow rate at the time of discharging air of the inside of the tire 50 to the outside (hereinafter simply called an "air discharge side") and a flow rate at the time of supplying (supplying) air from the air supply source 12 to the tire (hereinafter simply called an "air supply side"). In addition, the flow rate in a position of intersection between the axis of abscissa and the axis of ordinate is zero (that is, a state in which air is not supplied and discharged).

Here, the dead band d refers to a range of the differential pressure at which the pressure proportional control valve part 310 does not supply and discharge air, including the differential pressure of zero.

In addition, the pressure proportional control valve part 310 of the embodiment is configured by the electropneumatic regulator 312 and the volume booster 314, but is not limited to this configuration, and may be configured by one pressure proportional control valve.

The supply and discharge valve 307 is formed on the second piping 202, and performs switching between air supply from the air supply source 12 to the tire 50 and air discharge from the inside of the tire 50 to the outside by switching a position of the valve based on an instruction signal from the controller 14. By switching the supply and discharge valve 307 to the air discharge side, the internal pressure of the tire 50 increased to the bead seat pressure can be decreased to the test pressure or the vicinity of the test pressure in a short time.

The constant-flow air discharge part 320 is formed between the tire 50 and the pressure proportional control valve part 310 (specifically, the volume booster 314) in the piping 300, and is constructed so that air of the inside of the piping 300 can be discharged to the outside at a constant flow rate. The constant-flow air discharge part 320 of the embodiment is formed between the pressure sensor 306 and the supply and discharge valve 307 in the second piping 202. This constant-flow air discharge part 320 includes air discharge piping 321, a needle valve 322 formed on this air discharge piping 321, an air discharge part shutoff valve 323, and a muffler 324. This constant-flow air discharge part 320 discharges air of the inside of the second piping 202 to the outside at a constant flow rate and thereby, the characteristic curve c can be shifted to the air discharge side by the constant flow rate (see FIG. 2A). Accordingly, the differential pressure is maintained at a predetermined value (convergence value: see point A of FIG. 2A) of the minus side beyond the dead band d by the pressure proportional control valve part 310. As a result, the internal pressure of the tire 50 can be regulated in a shorter time than the conventional air circuit in which the differential pressure is maintained within the dead band d in which the pressure proportional control valve does not supply and discharge air. That is, when the differential pressure is changed from the high pressure side toward the convergence value by discharging the air of the inside of the second piping 202 at the constant flow rate, the differential pressure is changed in a short time (time according to the constant flow rate) so as to pass through the dead band in which the pressure proportional control valve part 310 does not supply and discharge air. As a result, the differential pressure can be converged to the convergence value in the short time, that is, the internal pressure of the tire 50 can be regulated to the test pressure in the short time.

The air discharge piping 321 is branched the portion from between the pressure sensor 306 and the supply and discharge valve 307 in the second piping 202, and provides communication between the outside and the inside of the second piping 202.

The needle valve 322 can regulate a flow rate of air discharged to the outside through the air discharge piping 321 by changing an opening. This needle valve 322 regulates the opening so that a mass flow rate Q (kg/s) of air discharged to the outside through the air discharge piping 321 becomes larger than a value expressed by the following formula (3).

$$Q=(V/RT)\gamma+(\alpha\Delta Ph/2) \quad (3)$$

Here, V is volume ($m^3$) of the inside of the tire 50 and the inside of the piping 300 from the tire 50 to the pressure proportional control valve part 310, and T is an absolute temperature (K) of air of the inside of the piping 300, and R is a gas constant (J/kg/K) of dry air, and γ is an increment (Pa/s) per second in the internal pressure of the tire 50 at the time of stopping operation of the constant-flow air discharge part 320 and the pressure proportional control valve part 310 in a state in which the internal pressure of the tire 50 is the test pressure, and α is a ratio (kg/Pa) of a change in air supply mass to a change in the differential pressure of the air supply side of the pressure proportional control valve part 310, and ΔPh is a range (Pa) of the differential pressure of the dead band d. In addition, γ is a maximum value of the plus side observed in various operation states assumed in various tires, and is a value previously obtained by experiment etc.

The opening of such a needle valve 322, that is, the flow rate of air discharged from the constant-flow air discharge part 320 to the outside is set as described below.

When the internal pressure of the tire 50 varies by a change in air temperature of the inside of the tire 50, variations in this internal pressure are equivalent to a situation in which air of the inside of the tire 50 is supplied or discharged. As a result, the characteristic curve c is shifted to the air discharge side when the internal pressure is decreased by a decrease in the air temperature of the inside of the tire 50, and the characteristic curve c is shifted to the air supply side when the internal pressure is increased by an increase in the air temperature as shown in FIG. 2B. Thus, at the time of the increase in the air temperature of the inside of the tire 50, the dead band d of the characteristic curve c approaches a flow rate of zero in the axis of ordinate. The pneumatic circuit 10 of the embodiment implements regulation of the internal pressure of the tire 50 with high accuracy in a short time by positioning the dead band d to the air discharge side beyond the flow rate of zero. As a result, it is necessary to position the dead band d of the characteristic curve c to the air discharge side also at the time of the increase in this air temperature. Hence, as described below, a mass flow rate Q1 of air in which the dead band d becomes the flow rate of zero at the time of the increase in the air temperature of the inside of the tire 50 is obtained, and a mass flow rate Q of air discharged from the needle valve 322 is set so as to become larger than this mass flow rate Q1.

When a mass flow rate of air discharged from the needle valve 322 is set at Q1 (kg/s), air mass Δm (kg) changing for t seconds becomes Q1t. Also, when a change ratio per second in a change in internal pressure by a change in air temperature of the inside of the tire 50 is set at γ (Pa/s), an internal pressure ΔP (Pa) changing for t seconds becomes γt. Since a state equation of air is PV=mRT herein, when P and m are substituted for the change ratios ΔP and Δm, ΔPV=ΔmRT is obtained. When Δm=Q1t and ΔP=γt described above are substituted for this equation, γV=Q1RT is obtained. From this equation, the mass flow rate Q1=(V/RT)γ of air in which the dead band d becomes the flow rate of zero at the time of the increase in the air temperature of the inside of the tire 50 is obtained.

Also, the pneumatic circuit 10 of the embodiment sets the mass flow rate Q of air by regulating the amount of discharge of air from the needle valve 322 in view of balance between the amount of consumption of air and time for regulating the internal pressure of the tire 50. Concretely, explanation is given below.

As the amount of discharge of air from the needle valve 322 is increased, time for which the differential pressure passes through the dead band d in the air discharge side becomes shorter, that is, the internal pressure of the tire 50 can be regulated in a short time, but the amount of consumption of air in the pneumatic circuit 10 is increased. Hence, the pneumatic circuit 10 of the embodiment sets the mass flow rate Q of air discharged from the needle valve 322 so as to perform pressure control of the air discharge side at a speed equivalent to that of pressure control (pressure change) of the air supply side without having the dead band d in the characteristic curve c.

The pressure proportional control valve part 310 regulates the flow rates of air supply and air discharge according to the differential pressure. When its sensitivity (ratio of a change in air supply mass to a change in the differential pressure of the air supply side of the pressure proportional control valve part 310) is set at α as shown in FIG. 2C, the case of controlling the internal pressure of the tire 50 in a pressure region ΔPh of the dead band d by air discharge of the needle valve 322 at a speed equivalent to that at the time when the pressure proportional control valve part 310 controls the internal pressure of the tire 50 with the sensitivity a is the case where their areas in FIG. 2C match substantially. That is, the case is the case where the mass flow rate Q2 of air discharged from the needle valve 322 becomes one-half (αΔPh/2) of αΔPh.

Hence, the needle valve 322 of the pneumatic circuit 10 of the embodiment is set so as to discharge air at the mass flow rate Q (=(V/RT)γ+(αΔPh/2)) obtained by adding the mass flow rate Q2 in view of the amount of consumption of air and regulation time of the internal pressure of the tire 50 to the mass flow rate Q1 at which the dead band d is positioned to the air discharge side beyond the flow rate of zero at the time of the increase in the air temperature of the inside of the tire 50 as described above.

The air discharge part shutoff valve 323 opens and closes the air discharge piping 321 by switching a position of the valve based on an instruction signal from the controller 14. The air discharge part shutoff valve 323 of the embodiment is arranged in the downstream side of the needle valve 322 in the air discharge piping 321, but may be arranged in the upstream side.

The muffler 324 is formed on the downstream side of the air discharge piping 321, and muffles an air discharge sound at the time of discharging air from the air discharge piping 321 to the outside.

The controller 14 respectively controls, for example, each of the valves 205, 305, 307, 310, 323 of the pneumatic circuit 10 in order to measure uniformity of the tire 50 in the uniformity machine 1. For example, the controller 14 outputs a target command pressure to the pressure proportional control valve part 310, and outputs instruction signals to the first and second shutoff valves 205, 305, the supply and discharge valve 307 and the air discharge part shutoff valve 323.

The tire testing apparatus 1 including such a pneumatic circuit 10 tests uniformity of the tire 50 as described below.

When the tire 50 is attached to the rim 2 of the uniformity machine 1, the controller 14 opens the first shutoff valve 205, and closes the second shutoff valve 305, and sets the supply and discharge valve 307 in an air supply state, and closes the air discharge part shutoff valve 323. Accordingly, air (for example, compressed air of about 0.4 MPa in the example of the embodiment) of a bead seat pressure supplied from the air supply source 12 is supplied to the tire 50 through the bead seat system 20, and the internal pressure of the tire 50 is increased, and the bead part is pressed on the rim to make close contact with the rim.

When the internal pressure of the tire 50 detected by the pressure sensor 306 reaches the bead seat pressure, after a lapse of a predetermined time since the internal pressure reached the bead seat pressure, the controller 14 closes the first shutoff valve 205, and maintains a state in which the second shutoff valve 305 is closed, and sets the supply and discharge valve 307 in an air discharge state, and maintains a state in which the air discharge part shutoff valve 323 is closed. Accordingly, supply of the air to the tire 50 is shut off and also, the air of the inside of the tire 50 is discharged from the supply and discharge valve 307 to the outside.

By this air discharge, the internal pressure of the tire 50 is decreased from the bead seat pressure toward the test pressure (from 0.4 MPa to 0.2 MPa in the example of the embodiment). Then, when the internal pressure of the tire 50 detected by the pressure sensor 306 approaches the test pressure, the controller 14 maintains a state in which the first shutoff valve 205 is closed, and opens the second shutoff valve 305, and sets the supply and discharge valve 307 in the air supply state, and opens the air discharge part shutoff valve 323. Accordingly, the test system 30 (pressure proportional control valve part 310) performs regulation so that the internal pressure of the tire 50 becomes the test pressure while discharging the air from the constant-flow air discharge part 320 at a constant flow rate (mass flow rate) Q. Concretely, the pressure proportional control valve part 310 supplies and discharges the air to thereby converge the differential pressure to the convergence value (see point A of FIG. 2A). Accordingly, the internal pressure of the tire is regulated to the test pressure.

When the internal pressure of the tire 50 becomes the test pressure, a drum (not shown) is pressed on the tire 50 and in this state, the tire 50 is rotated and thereby, for example, a load measuring device (not shown) formed inside the drum measures a repulsion force generated in the tire 50. In this manner, the uniformity of the tire 50 is tested.

After the completion of the test, the controller 14 maintains a state in which the first shutoff valve 205 is closed, and closes the second shutoff valve 305, and sets the supply and discharge valve 307 in the air discharge state, and closes the air discharge part shutoff valve 323. Accordingly, the air of the inside of the tire is completely discharged, and the tire 50 can be detached from the rim 2.

According to the pneumatic circuit 10 described above, by discharging air of the inside of the second piping 202 from the constant-flow air discharge part 320 to the outside at a constant mass flow rate Q, the characteristic curve c can be shifted to the air discharge side by the mass flow rate Q (see FIG. 2A) to thereby regulate the internal pressure of the tire 50 with high accuracy in a short time. Concretely, explanation is given below.

Since the differential pressure is maintained at the convergence value (see point A of FIG. 2A) of the minus side of the dead band d by shifting the characteristic curve c to the air discharge side, the internal pressure of the tire 50 can be regulated with higher accuracy in a shorter time than the conventional air circuit in which the differential pressure is maintained in the dead band in which the pressure proportional control valve does not supply and discharge air.

Since the characteristic curve c is shifted to the air supply side by an increase in air temperature of the inside of the tire 50 (see FIG. 2B), the pneumatic circuit 10 of the embodiment sets the mass flow rate Q of air discharged from the constant-flow air discharge part 320 so as to position the dead band d to the air discharge side beyond the flow rate of zero in a state shifted to this air supply side. As a result, the internal pressure of the tire 50 can be regulated more surely with higher accuracy in a shorter time.

Also, the pneumatic circuit 10 of the embodiment reduces the amount of air used while shortening time for regulating the internal pressure of the tire 50 by regulating the differential pressure in the air discharge side including the dead band d in the characteristic curve c at a speed similar to that of regulation of the differential pressure in the air supply side.

In addition, the pneumatic circuit of the tire testing apparatus of the invention is not limited to the embodiment described above, and various changes can naturally be made without departing from the gist of the invention.

The concrete configuration of the constant-flow air discharge part 320 is not limited. For example, it is unnecessary to provide the constant-flow air discharge part 320 with the air discharge part shutoff valve 323 and/or the muffler 324. Also, the constant-flow air discharge part 320 may be, for example, configured to provide the second piping 202 with an orifice as long as air can be discharged to the outside at a constant flow rate.

Also, the mass flow rate Q (kg/s) of air discharged from the constant-flow air discharge part 320 at the time of test of uniformity of the tire 50 is not limited to the value expressed by formula (3) ($Q = (V/RT)\gamma + (\alpha \Delta Ph/2)$).

For example, the mass flow rate Q of the air has only to be larger than $Q = (V/RT)\gamma$. According to such a configuration, the internal pressure of the tire can be regulated with high accuracy in a short time. Also, the mass flow rate Q of the air may be larger than $Q = (V/RT)\gamma + (\alpha \Delta Ph/2)$. According to such a configuration, the amount of consumption of air is increased, but the internal pressure of the tire 50 can be regulated in a shorter time.

EXAMPLE

Here, in order to check an effect of the pneumatic circuit of the embodiment described above, experiments to regulate an internal pressure of the tire 50 were performed using the pneumatic circuit 10 of the embodiment described above and a pneumatic circuit (conventional pneumatic circuit) with the same configuration as that of the pneumatic circuit 10 except that there is no constant-flow air discharge part.

Concretely, explanation is given below.

When the internal pressure of the tire 50 was increased to a bead seat pressure, an air temperature of the inside of the tire 50 was highly increased by adiabatic compression. As a result, when the internal pressure of the tire 50 was decreased to a test pressure soon after the internal pressure of the tire 50 was increased to the bead seat pressure, the air temperature of the inside of the tire 50 became higher than an ambient temperature. On the other hand, after the internal pressure of the tire 50 was increased to the bead seat pressure, this pressure was held until the air temperature of the inside of the tire 50 was propagated to surroundings and was decreased, and when the pressure was decreased to the test pressure after the air temperature of the inside of the tire 50 was decreased, the air temperature of the inside of the tire 50 became lower than the ambient temperature. Experiments to change the air temperature of the inside of the tire 50 by regulating holding time of the bead seat pressure in the case of decreasing the internal pressure of the tire 50 to the test pressure after the internal pressure of the tire 50 was increased to the bead seat pressure in this manner were performed.

Also, experiments in the cases where the internal pressure of the tire 50 approached a target command pressure from the high pressure side and the low pressure side by changing timing of switching the supply and discharge valve 307 from air discharge (reduction in pressure) to air supply (start of regulation of pressure) based on a measured value of the pressure sensor 306 in the case of making a transition from the bead seat pressure to the test pressure were performed.

Figure 3A:
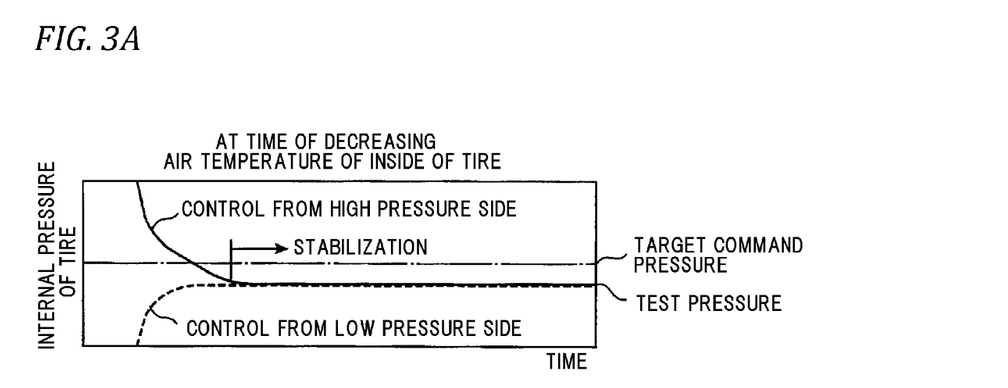
FIG. 3A is a diagram showing change characteristics of an internal pressure of the tire in the tire testing apparatus, and is a graph showing the change characteristics at the time of decreasing the air temperature of the inside of the tire.
Figure 3B:
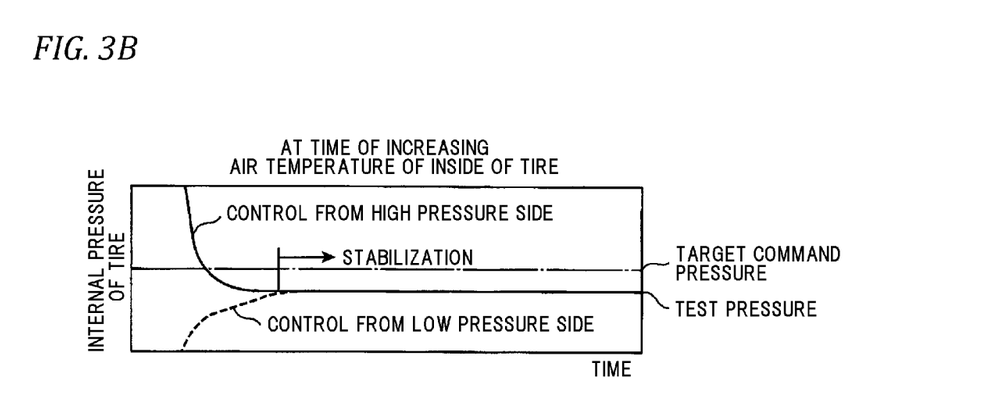
FIG. 3B is a diagram showing change characteristics of the internal pressure of the tire in the tire testing apparatus, and is a graph showing the change characteristics at the time of increasing the air temperature of the inside of the tire.
Figure 4A:
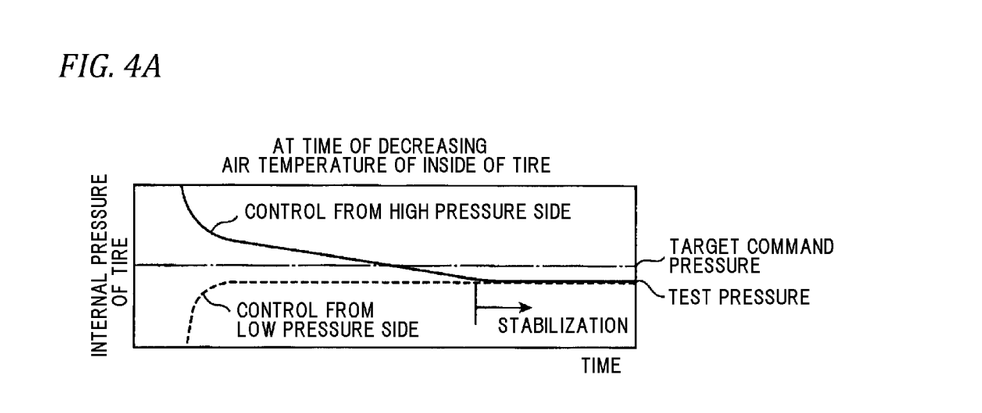
FIG. 4A is a diagram showing change characteristics of the internal pressure of the tire in a conventional tire testing apparatus, and is a graph showing the change characteristics at the time of decreasing the air temperature of the inside of the tire.
Figure 4B:
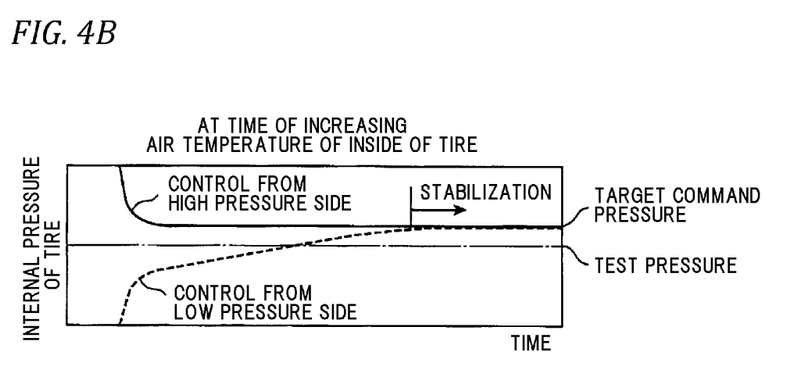
FIG. 4B is a diagram showing change characteristics of the internal pressure of the tire in the conventional tire testing apparatus, and is a graph showing the change characteristics at the time of increasing the air temperature of the inside of the tire.

The results of the experiments described above are shown in FIGS. 3A, 3B, 4A and 4B. FIG. 3A shows change characteristics of the internal pressure of the tire at the time of decreasing the air temperature of the inside of the tire 50 in the case of using the pneumatic circuit 10 of the embodiment described above. FIG. 3B shows change characteristics of the internal pressure of the tire at the time of increasing the air temperature of the inside of the tire 50 in the case of using the pneumatic circuit 10 of the embodiment described above. FIG. 4A shows change characteristics of the internal pressure of the tire at the time of decreasing the air temperature of the inside of the tire 50 in the case of using the conventional pneumatic circuit. FIG. 4B shows change characteristics of the internal pressure of the tire at the time of increasing the air temperature of the inside of the tire 50 in the case of using the conventional pneumatic circuit.

These results could check that the internal pressure of the tire 50 became stable at a constant value (test pressure) in a shorter time in the case of using the pneumatic circuit 10 of the embodiment described above in both of the case where the internal pressure of the tire 50 approached the target command pressure from the high pressure side and the case where the internal pressure of the tire 50 approached the target command pressure from the low pressure side.

Also, it could be checked that the internal pressure of the tire 50 became stable at the constant value (test pressure) in a shorter time in the case of using the pneumatic circuit 10 of the embodiment described above in both of the case where the air temperature of the inside of the tire 50 was higher than the ambient temperature and the case where the air temperature of the inside of the tire 50 was lower than the ambient temperature.

The invention has been described in detail with reference to the specific embodiment, but it is apparent to those skilled in the art that various changes or modifications can be made without departing from the spirit and scope of the invention.

The present application is based on Japanese patent application (patent application No. 2013-077410) filed on Apr. 3, 2013, and the contents of the patent application are hereby incorporated by reference.

DESCRIPTION OF REFERENCE NUMERALS AND SIGNS

1 UNIFORMITY MACHINE (TIRE TESTING APPARATUS)
10 PNEUMATIC CIRCUIT
12 AIR SUPPLY SOURCE

14 CONTROLLER (CONTROL PART)
20 BEAD SEAT SYSTEM
200 PIPING OF BEAD SEAT SYSTEM
30 TEST SYSTEM
300 PIPING OF TEST SYSTEM
306 PRESSURE SENSOR (PRESSURE MEASURING PART)
310 PRESSURE PROPORTIONAL CONTROL VALVE PART
312 ELECTROPNEUMATIC REGULATOR
314 VOLUME BOOSTER
320 CONSTANT-FLOW AIR DISCHARGE PART
322 NEEDLE VALVE
50 TIRE
c CHARACTERISTIC CURVE OF AIR SUPPLY AND DISCHARGE IN PRESSURE PROPORTIONAL CONTROL VALVE PART
d DEAD BAND

The invention claimed is:

1. A pneumatic circuit of a tire testing apparatus for measuring uniformity of a tire, comprising:
a piping configured to guide air from an air supply source to the tire;
a control part configured to output a target command pressure which is a value of a predetermined air pressure;
a pressure proportional control valve part which is formed on the piping and supplies and discharges the air of a flow rate proportional to a differential pressure between the target command pressure and an internal pressure of the tire so that the internal pressure of the tire becomes the target command pressure and has a dead band in which the air is not supplied and discharged within a predetermined range including the differential pressure of zero; and
a constant-flow air discharge part which is formed between the tire and the pressure proportional control valve part in the piping and is configured to discharge the air of an inside of the piping to an outside at a constant flow rate.

2. The pneumatic circuit of the tire testing apparatus according to claim 1, wherein
the constant-flow air discharge part discharges the air to the outside at a flow rate at which the dead band is positioned to an air discharge side when an air temperature of an inside of the tire is increased at the time of measuring the uniformity.

3. The pneumatic circuit of the tire testing apparatus according to claim 1, wherein
a mass flow rate Q (kg/s) of the air discharged to the outside by the constant-flow air discharge part is larger than a value expressed by the following formula (1):

$$Q=(V/RT)\gamma \qquad (1)$$

here, V is volume (m³) of the inside of the tire and the inside of the piping from the tire to the pressure proportional control valve part, and T is an absolute temperature (K) of the air of the inside of the piping, and R is a gas constant (J/kg/K) of dry air, and γ is an increment (Pa/s) per second in the internal pressure of the tire at the time of stopping operation of the constant-flow air discharge part and the pressure proportional control valve part in a state in which the internal pressure of the tire is a test pressure at the time of measuring the uniformity.

4. The pneumatic circuit of the tire testing apparatus according to claim 3, wherein
the mass flow rate Q (kg/s) of the air discharged to the outside by the constant-flow air discharge part is expressed by the following formula (2):

$$Q=(V/RT)\gamma+(\alpha \Delta Ph/2) \qquad (2)$$

here, α is a ratio (kg/Pa) of a change in air supply mass to a change in the differential pressure of an air supply side of the pressure proportional control valve part, and ΔPh is a range (Pa) of the differential pressure of the dead band.

* * * * *